United States Patent Office 2,937,083
Patented May 17, 1960

2,937,083

HARD SURFACING WELD DEPOSIT FOR CAST IRON

Raymond F. Sherwin, Highland Park, Ill., assignor to The Chicago Hardware Foundry Company, North Chicago, Ill., a corporation of Illinois No Drawing. Application March 25, 1958
Serial No. 723,630

1 Claim. (Cl. 75—125)

The present invention is directed to improvements in the art of welding rods or, more specifically, to the production of rods used for hard surfacing of cast iron.

In the past, some use has been made of chromium in cast iron welding rods in an attempt to increase the hardness of the deposit. However, even with a very careful application, it was frequently found that the presence of the chromium resulted in the production of hairline cracks in the weld deposit.

Accordingly, an object of the present invention is to provide an improved cast iron welding rod which may be employed for hard surfacing without the production of cracks in the weld deposit.

Another object of the invention is to provide an improved cast iron welding rod containing a sufficient amount of chromium to increase the hardness of the deposit, but compensating for the effects of chromium by the addition of other alloying elements.

Still another object of the invention is to provide a cast iron welding rod which, with proper application, can be employed to produce a weld deposit which can be readily faced off with a cutting wheel or machined with a high speed drill.

In accordance with the present invention, I now provide a cast iron welding rod containing chromium and a sufficient amount of copper to overcome the otherwise objectionable features of the chromium addition. To this copper-chromium-cast iron rod, I also add other alloying elements such as molybdenum in order to increase the ability of the weld deposit to withstand stresses of wear and abrasion.

The improved cast iron welding rods of this invention have analyses within the following ranges:

| | Percent |
|---|---|
| Carbon | 3.25 to 3.50 |
| Silicon | 2.0 to 3.5 |
| Manganese | 0.5 to 1.0 |
| Phosphorus | 0.1 to 1.0 |
| Sulfur | 0.1 max. |
| Copper | 0.5 to 2.5 |
| Chromium | 0.15 to 0.5 |
| Molybdenum | 0.15 to 0.5 |
| Iron | Substantially the balance |

Within the broader range specified above, the following represents a preferred composition:

| | Percent |
|---|---|
| Carbon | 3.40 to 3.50 |
| Silicon | 2.5 to 3.0 |
| Manganese | 0.6 to 0.75 |
| Phosphorus | 0.15 to 0.35 |
| Sulfur | 0.1 max. |
| Copper | 0.6 to 1.5 |
| Chromium | 0.2 to 0.4 |
| Molybdenum | 0.3 to 0.5 |
| Iron | Substantially the balance |

Cast iron rods having the improved properties mentioned were prepared in the following manner. The starting material was a typical weld rod iron having the following analysis:

| | Percent |
|---|---|
| Carbon | 3.25 to 3.50 |
| Silicon | 2.75 to 3.00 |
| Manganese | 0.60 to 0.75 |
| Phosphorus | 0.15 to 0.35 |
| Sulfur | 0.096 max. |
| Iron | Substantially the balance |

This weld rod iron was melted in a cupola at a temperature of 3200° F. and poured into ladles which were inoculated with predetermined amounts of copper, chromium, and molybdenum. The molten metal was then poured into sand molds and resulted in a composition having the following analysis:

| | Percent |
|---|---|
| Carbon | 3.46 |
| Silicon | 2.40 |
| Manganese | 0.60 |
| Phosphorus | 0.281 |
| Sulfur | .096 |
| Copper | 1.06 |
| Chromium | 0.24 |
| Molybdenum | 0.33 |
| Iron | Balance |

The micro-structure of this rod evidenced the matrix of a dense pearlite in which there were small areas of ferrite and areas of a phosphide eutectic.

Physical tests made on the rod from a 1.2 inch test bar evidenced a hardness of 223 Brinell, a deflection of .25 inch, a transverse strength of 2,340 p.s.i. and a tensile strength of 24,600 p.s.i.

To secure the maximum advantages of the improved welding rod, certain procedures should be observed. For hard surfacing applications, it is best to use a multiple flame tip, making the rod flow in a plastic stage instead of liquid form. It is also best to preheat the metal to 400° F. prior to the application of the surfacing material, and then cover the welded area with a heat insulator such as asbestos to avoid chilling the weld and then letting it cool.

Comparable results can be obtained by using an acetylene welding torch with a number 5 tip adjusted for a slight excess of acetylene and held about ¼ inch away from the metal to avoid porosity.

It is generally desirable to make several passes with the flame in order to provide greater strength, hardness, and toughness to the deposited metal.

When the surfacing material is properly applied, the weld deposit will evidence a Brinnell hardness in the range from about 255 to about 325. At this hardness, the deposit can be readily faced off with a cutting wheel or machined with a high speed drill.

The micro-structure of the weld deposit shows a fine pearlite in which there is small areas of phosphide eutectic.

The inclusion of copper with the chromium has a beneficial effect of eliminating hairline cracks but has the further advantages of permitting lower temperatures (usually 50 to 100° F. lower) to be employed for the welding, providing a rust resistant, heat resistant, and wear resistant weld.

The welding rods can be used in the as cast condition, but I prefer to first clean the rods and then nickel plate them by means of a flash coating, electrolytically applied. The thickness of the coating is approximately 0.0001 to 0.0005 inch. The nickel plating on the rod prevents rusting of the iron and improves the flowability of the material to a small extent but has the important advantage of providing a stabilizing effect on the weld.

It will be evident that various modifications can be made to the described embodiments without departing from the scope of the present invention.

I claim as my invention:

A weld deposit produced by heating a welding rod having the following analysis:

| | Percent |
|---|---|
| Carbon | 3.25 to 3.50 |
| Silicon | 2.0 to 3.5 |
| Manganese | 0.5 to 1.0 |
| Phosphorus | 0.1 to 1.0 |
| Sulfur | 0.1 max. |
| Copper | 0.5 to 2.5 |
| Chromium | 0.15 to 0.5 |
| Molybdenum | 0.15 to 0.5 |
| Iron | Substantially the balance | applying said rod while the metal therein is still in a plastic stage to a cast iron surface, covering the welded area with a heat insulating material, and allowing said welded area to cool.

References Cited in the file of this patent
UNITED STATES PATENTS

| 2,158,105 | Burgess | May 16, 1939 |
| 2,214,652 | Bancroft | Sept. 10, 1940 |

OTHER REFERENCES

Gregg et al.: "Alloys of Iron and Copper," 1934, pp. 303–306. Published by McGraw-Hill Book Co., Inc., New York, N.Y.

Manning et al.: Mining and Metallurgy, vol. 26, No. 468, December 1945, pp. 603–605. Published by the American Institute of Mining, Metallurgical and Petroleum Engineers, Inc., New York, N.Y.